United States Patent [19]

Fichtinger

[11] 4,407,400

[45] Oct. 4, 1983

[54] WINCH CONTROL VALVE

[75] Inventor: Gary R. Fichtinger, Hazel Green, Wis.

[73] Assignee: Deere & Company, Moline, Ill.

[21] Appl. No.: 229,398

[22] Filed: Jan. 29, 1981

[51] Int. Cl.³ ......................... F16D 67/04; F15B 13/07

[52] U.S. Cl. .................................. 192/12 C; 137/596; 137/625.68; 137/864; 137/871

[58] Field of Search ................ 192/12 C, 13 R, 17 A, 192/18 A; 137/596, 625.68, 864, 871

[56] References Cited

U.S. PATENT DOCUMENTS 3,729,171 4/1973 Yates et al. .................... 192/18 A X 3,991,787 11/1976 Schmitt et al. ............... 192/12 C X

*Primary Examiner*—Allan D. Herrmann

[57] ABSTRACT

A winch control valve is provided for controlling the flow of fluid to and from a clutch and a brake of a winch transmission which are operable for establishing a hold condition in the winch when no fluid pressure is connected to the clutch and brake, a free spool condition wherein pressure fluid is connected to only the brake, and a wind-in condition wherein fluid pressure is connected to both the clutch and the brake. In addition, the valve spool is provided with lands which are dimensioned slightly smaller than service ports leading to the clutch and brake of the winch so that pressure fluid may selectively be routed to the service ports and at the same time, be metered to sump whereby a partial clutch engagement pressure may be effected in the clutch to thereby establish an inching condition and whereby partial pressure may be established in the brake passage for effecting a partial release thereof so as to establish a controlled release condition in the winch. Also provided is a pin-operated inlet check ball for connecting pressurized fluid to the control valve when needed. The pin is, in turn, operated through means of a cam on the winch control valve spool such that the check ball is unseated by rolling it off a fluid pressure outlet leading from a valve housing to which a source of fluid pressure is connected.

4 Claims, 1 Drawing Figure

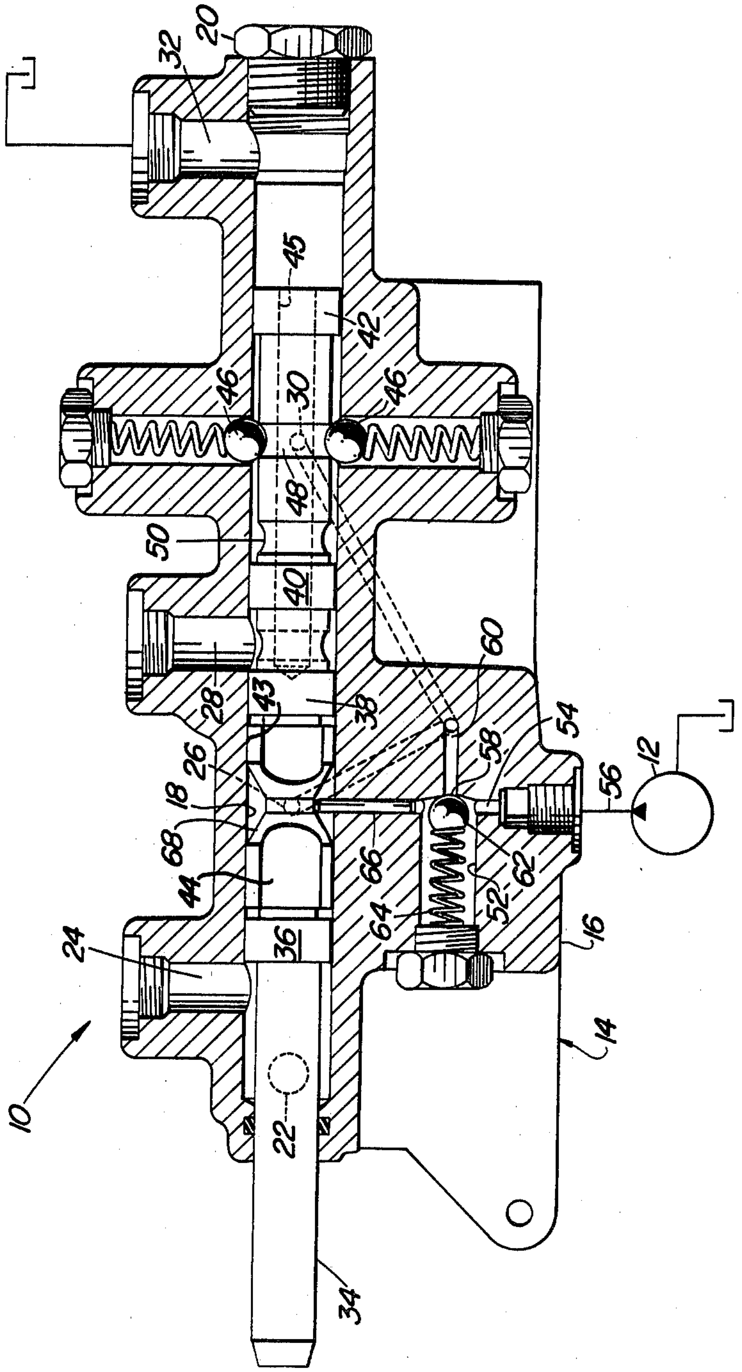
20
32
45
42
46
30
46
48
50
40
60
28
43
38
54
58
26
18
56
12
68
66
62
44
64
52
16
24
36
14
10
22
34

WINCH CONTROL VALVE

BACKGROUND OF THE INVENTION

The present invention relates to winch control valves and more particularly relates to control valves for winch transmissions having a normally disengaged, pressure-engageable clutch and a normally spring-engaged, pressure-releasable brake.

The hydraulic control systems for these transmissions are often of a basic type including a directional control valve comprising a valve spool movable to a hold position wherein the brake is engaged and the clutch is disengaged, a wind-in position wherein the brake is disengaged and the clutch is engaged, and a free spool position wherein both the brake and clutch are disengaged. In some prior art for winch transmissions of this basic type of design, the control valve for the winch operates so as to vary the hydraulic fluid pressure routed to the hydraulic brake to thereby establish a controlled release condition in the winch drum so that loads on the winch cable could be lowered at a controlled rate. Such a control valve is disclosed in U.S. Pat. No. 3,529,702, issued to Eckstein, Jr. on Sept. 22, 1970.

A desirable feature which is incorporated in some more complex winch transmissions and controls therefor is that of providing for a controlled wind-in of the cable which permits the winch drive to slip when a predetermined load exists on the cable to thereby eliminate cable breakage and other damage when a load being winched in becomes caught by an immovable object or engages the rear of the vehicle. This mode of operation is sometimes called an inching mode.

SUMMARY OF THE INVENTION

According to the present invention, there is provided an improved control valve for a winch transmission.

An object of the invention is to provide a winch control valve of a simple construction which functions to effect a controlled release condition in a winch and also an inching condition.

A more specific object of the invention is to provide a winch control valve which operates to manually modulate the flow of fluid pressure to a normally engaged brake so as to establish a controlled release condition therein and to also modulate the flow of fluid to a normally disengaged clutch to effect a partial engagement therein so as to establish an inching condition in the winch.

Yet a more specific object of the invention is to provide a valve spool having valve lands dimensioned so as to be slightly narrower than the diameter of respective brake and clutch service ports whereby when the lands are disposed directly over the service port, pressure fluid is metered to the sump while being also in communication with the brake or clutch to thereby maintain a pre-selected partial release or partial engagement pressure thereat.

These and other objects will become apparent from a reading of the ensuing description, together with the appended drawing.

BRIEF DESCRIPTION OF THE DRAWING

The sole FIGURE is a partial schematic representation of a control system for a winch transmission and showing a vertical, sectional view of the control valve.

DESCRIPTION OF THE PREFERRED EMBODIMENT

Referring now to the drawing, therein is shown a pertinent part of a winch transmission control system 10, including a source of fluid pressure here shown in the form of a pump 12 which delivers fluid to a directional control valve 14 which is operable for routing fluid to hydraulic pressure-operated clutch and brake assemblies (not shown) of a winch transmission.

The directional control valve 14 includes a valve body 16 which defines a valve bore 18 having its right-hand end closed by a threaded plug 20. The valve bore 18 is intersected by a plurality of ports and beginning from the left-hand end of the bore and preceding to its right-hand end, these ports comprise a sump port 22, a clutch service port 24, a pressure port 26, a brake service port 28, a second pressure port 30 and a second sump port 32. A valve spool 34 is reciprocably mounted in the valve bore and includes a plurality of axially spaced lands 36, 38, 40 and 42, as considered serially from left to right, for controlling the flow of fluid among the various ports. Additionally, the spool 34 includes a cam section 43 located between the lands 36 and 38 for controlling the flow of fluid pressure to the ports 26 and 30, in a manner described in detail below. It is here noted that the cam section 43 includes diametrically opposite flats 44 (only one visible) which extend the length of the cam section 43 so as to cooperate with the bore 18 to define a passage permitting the free flow of fluid between the lands 36 and 38.

When the valve spool 34 is in a hold position, as shown, the valve lands 36 and 38 are located on opposite sides of the first pressure port 26 and respectively rightwardly and leftwardly of the clutch and brake service ports 24 and 28. Additionally, the land 40 is located between the brake service port 28 and the second pressure port 30, and the land 42 is located between the second pressure port 30 and the sump port 32. A sump passage 45 extends axially leftwardly in the spool 34 from the right end thereof to a location between the lands 38 and 40 whereat it extends radially to the surface of the spool so as to place the area between the lands 38 and 40 in constant fluid communication with the sump port 32. Thus, with the spool 34 in its illustrated hold position, the clutch and brake service ports 24 and 28 are respectively connected to the sump ports 22 and 32 to thereby effect disengagement of the clutch and engagement of the brake.

Provided for releasably retaining the valve spool in its hold position are a pair of spring-loaded detent balls 46 which are spring-engaged with an annular detent groove 48 formed in the valve spool. A second detent groove 50 is spaced leftwardly from the groove 48 and the detent balls 46 seat in this groove when the valve spool 34 is shifted rightwardly to a free spool position wherein the clutch service port 24 remains connected to sump while the brake service port 28 is connected to the first pressure port 26. In addition to the two detented positions, the valve spool 34 may be moved to three non-detented positions. Specifically, the valve spool 34 may be shifted leftwardly to a wind-in position wherein a left-hand edge of the valve land 36 is located between the first sump port 22 and the clutch service port 24 while a left-hand edge of the valve land 40 is located leftwardly of the brake service port 28. Fluid pressure at port 26 is then connected to the clutch service port 24, by way of the passage defined by the bore 18 and the flats 44, and fluid pressure at the port 30 is then connected to the brake service port 28 so as to effect a clutch-engaged, brake release condition in the winch transmission. Of importance is the fact that the valve lands 36 and 38 are respectively narrower than the diameters of the clutch and brake service ports 24 and 28. This makes it possible to establish a partial clutch or inching condition by shifting the valve spool 34 leftwardly, from its shown position, a distance sufficient to place the land 36 completely within the port 24 to thereby expose the fluid pressure at the inlet port 26 both to the clutch service port 24 and the sump port 22 with the pressure routed for clutch engagement increasing from zero to full-clutch engagement pressure as the land 36 moves leftwardly across the port 24. Similarly, a partial brake or controlled release condition may be established by shifting the valve spool 34 rightwardly, from its shown position, a distance sufficient to place the land 38 completely within the port 28 to thereby expose the fluid pressure at the inlet port 26 both to the brake service port 28 and the sump passage 44 with the pressure routed for brake disengagement increasing from zero to full brake engagement pressure as the spool 38 moves rightwardly across the port 28.

Movement of the valve spool 34 to opposite sides of its illustrated hold position effects connection of the output of the pump 12 to the pressure ports 26 and 30. Specifically, a housing or valve chamber 52 is provided in the valve body 16, adjacent to the valve bore 18. Intersecting the right-hand end of the housing 52 is a pressure fluid inlet 54 which is connected to the outlet of the pump 12 by means of a conduit 56. An outlet 58 extends axially from the housing 52 and is connected to the pressure ports 26 and 30 by means of a branched passage 60. Located in the housing 52 is an inlet check ball 62 which is biased into sealing engagement with the outlet 58 by means of a coil compression spring 64. An actuating pin 66 is reciprocably mounted in the valve body 16 in crosswise relationship to the outlet 58 and has one end which extends into the housing 52 and another end which projects into the valve bore 18 at a central location between the valve lands 36 and 38 when the valve spool 34 is in its hold position, as illustrated. The cam section 43 of the valve spool 34 is provided with an annular recess having a shape like two truncated cones joined together at their smaller ends and which forms a cam surface 68 for operating the pin 66 when the valve spool 34 is shifted to either side of its illustrated hold position. Thus, when the spool 34 is shifted to either side of its hold position, the cam surface 68 moves the actuating pin 66 into engagement with the check ball 62 so as to roll the latter off the outlet 58. It is here noted that the check ball 62 is sized to have a diameter which is at least three times the diameter of the outlet whereby the force required to unseat the ball is greatly reduced as compared to unseating the ball by use of a pin located therebeneath, as is the practice in the prior art.

The foregoing description is thought to make the operation of the invention apparent and for the sake of brevity, a description of the operation of the spool is not reiterated. Suffice it to say that by making the spool lands 36 and 38 of a width slightly less than that of the diameter of the clutch and brake service ports 24 and 28, a structure is provided for manually modulating the pressure to the clutch and brake of the winch so that partial clutch engagement and partial brake disengagement may be accomplished without the use of metering grooves and the like, as are used in the prior art.

I claim:

1. A winch transmission control valve comprising: a valve body defining a valve bore; sump port means, pressure port means and clutch service and brake service ports intersecting the bore at axially spaced locations therealong; a valve spool located in the bore and including fluid directing means for controlling the flow of fluid to and from the clutch and brake service ports; said fluid direction means including a first land means operable when the spool is in an inching position for simultaneously connecting the clutch service port to the sump and pressure port means to thereby effect a partial engagement of a pressure-engageable clutch to which the clutch service port is adapted for connection; and a second land means operable when the spool is in a controlled release position for simultaneously connecting the brake service port to the sump and pressure port means to thereby effect a partial disengagement of a brake to which the brake service port is adapted for connection.

2. The winch transmission defined in claim 1 wherein the first land means includes a land having a width slightly less than the diameter of the clutch service port and the sump and pressure port means respectively being on opposite sides of the land and in fluid communcation with each other when the spool is in its inching position; and the second land measn including a second land having a width slightly less than the diameter of the brake service port and the sump and pressure port means respectively being on opposite sides of the second land and in fluid communication with each other when the spool is in its controlled release position.

3. The hydraulic control system defined in claim 1 and further including a source of fluid pressure; a pressure supply passage connected between the source and the pressure port means; a check valve located in the supply passage and including a chamber having an inlet connected to the source and an outlet connected to a remaining portion of the supply passage, a check ball, a spring biasing the check ball into seated engagement with the outlet; said ball having a diameter which is approximately three times the diameter of the outlet; an actuating pin projecting into the chamber in crosswise relationship to the outlet and in alignment with the check ball; said pin being reciprocably mounted; and a cam located on the valve spool and positioned for operating the pin to unseat the check ball whenever the spool is moved toward its inching and controlled release positions.

4. In a hydraulic control system for a winch transmission including a pressure-engageable clutch and a pressure-disengageable brake, a source of fluid pressure, a sump, a winch control valve connected to the source, sump, clutch and brake and selectively operable to connect both the clutch and the brake to sump to establish a hold condition, to connect the source only to the clutch to establish a wind-in condition and to connect the source only to the brake to establish a free spool condition, the improvement comprising: said control valve including a valve body defining a valve bore; first and second pressure ports intersecting the bore at axially spaced locations therealong, first and second sump outlets intersecting the bore at axially spaced locations arranged with the pressure inlets located therebetween; a clutch service port located between the first sump and pressure ports; a brake service port located between the first and second pressure inlets; a valve spool received in the bore and including first, second, third and fourth lands arranged serially therealong; a sump passage in the spool having one end opening between the second and third lands and a second end located in constant fluid communication with the second sump port; said first and second lands respectively having a width slightly less than the diameter of the clutch and brake service ports; and said spool being selectively positionable in a hold position, wherein the clutch and brake service ports are respectively connected to the first sump port and the one end of the sump passage, an inching position wherein the first land is positioned to connect the clutch service port to the first sump and pressure ports, so as to effect partial clutch engagement, and wherein the brake service port remains connected to the one end of the sump passage, a wind-in position wherein the clutch and brake service ports are respectively connected to the first and second pressure ports, a controlled release position wherein the clutch service port is connected to the first sump port and the second land is positioned for connecting the brake service port to the first pressure port and to the one end of the sump passage, so as to effect partial brake disengagement, a free spool position wherein the clutch and brake service ports are respectively connected to the first sump and second pressure ports.

* * * * *